United States Patent [19]
Teramoto et al.

[11] Patent Number: 5,896,293
[45] Date of Patent: Apr. 20, 1999

[54] METHOD OF MANAGING INFORMATION EXCHANGED BETWEEN PRODUCTION INFORMATION SUPERVISORY COMPUTER AND LINE SUPERVISORY COMPUTERS FOR PRODUCTION OF PHOTO FILM CARTRIDGE

[75] Inventors: Junichi Teramoto; Hiroshi Seikai; Nobuyasu Akiyoshi; Susumu Sato, all of Kanagawa, Japan

[73] Assignee: Fuji Photo Film Co., Ltd., Kanagawa, Japan

[21] Appl. No.: 08/821,077

[22] Filed: Mar. 20, 1997

[30] Foreign Application Priority Data

Mar. 22, 1996 [JP] Japan .................. 8-066939

[51] Int. Cl.[6] .............. G06F 19/00; G06G 7/64; G06G 7/66
[52] U.S. Cl. .................. 364/468.18; 364/468.01; 364/468.16; 364/468.22; 242/532.4; 242/532.5
[58] Field of Search .............. 364/468.01, 468.04, 364/468.06, 468.8, 468.09, 468.16, 468.18, 468.22, 468.23, 468.24, 469.01, 469.04, 469.05, 470.06; 242/532.4, 332.7, 348.1, 532.5, 532.6, 532.7; 29/430, 417, 429, 779–783, 819

[56] References Cited

U.S. PATENT DOCUMENTS

| | | |
|---|---|---|
| 4,561,235 | 12/1985 | Yanagisawa et al. .............. 53/411 |
| 5,229,585 | 7/1993 | Lemberger et al. .............. 235/375 |
| 5,255,197 | 10/1993 | Iida .............. 364/469 |
| 5,447,827 | 9/1995 | Ishikawa et al. .............. 430/434 |
| 5,479,691 | 1/1996 | Shimizu et al. .............. 29/430 |
| 5,573,201 | 11/1996 | Takahashi et al. .............. 242/532.4 |
| 5,584,441 | 12/1996 | Watkins et al. .............. 242/348.1 |

FOREIGN PATENT DOCUMENTS

| | | | |
|---|---|---|---|
| 6-130548 | 5/1994 | Japan .............. | G03C 1/76 |
| 7-120889 | 5/1995 | Japan .............. | G03C 3/00 |

*Primary Examiner*—William Grant
*Assistant Examiner*—Ramesh Patel
*Attorney, Agent, or Firm*—Sughrue, Mion, Zinn, Macpeak & Seas, PLLC

[57] ABSTRACT

Supervisory computers are individually disposed in a molding line for molding a pair of shell halves, a cartridge assembly line for assembling a cartridge shell from the pair of shell halves and other parts, a winding line for producing and winding each individual filmstrip into each individual cartridge shell, a packaging line for packaging the photo film cartridges, and those of other lines or other processes. Each supervisory computer controls process controllers of the associated line. The supervisory computers are controlled by a production information supervisory computer. Data obtained from the process controllers is sent through the line supervisory computers to the production information supervisory computer, to be stored therein.

23 Claims, 7 Drawing Sheets

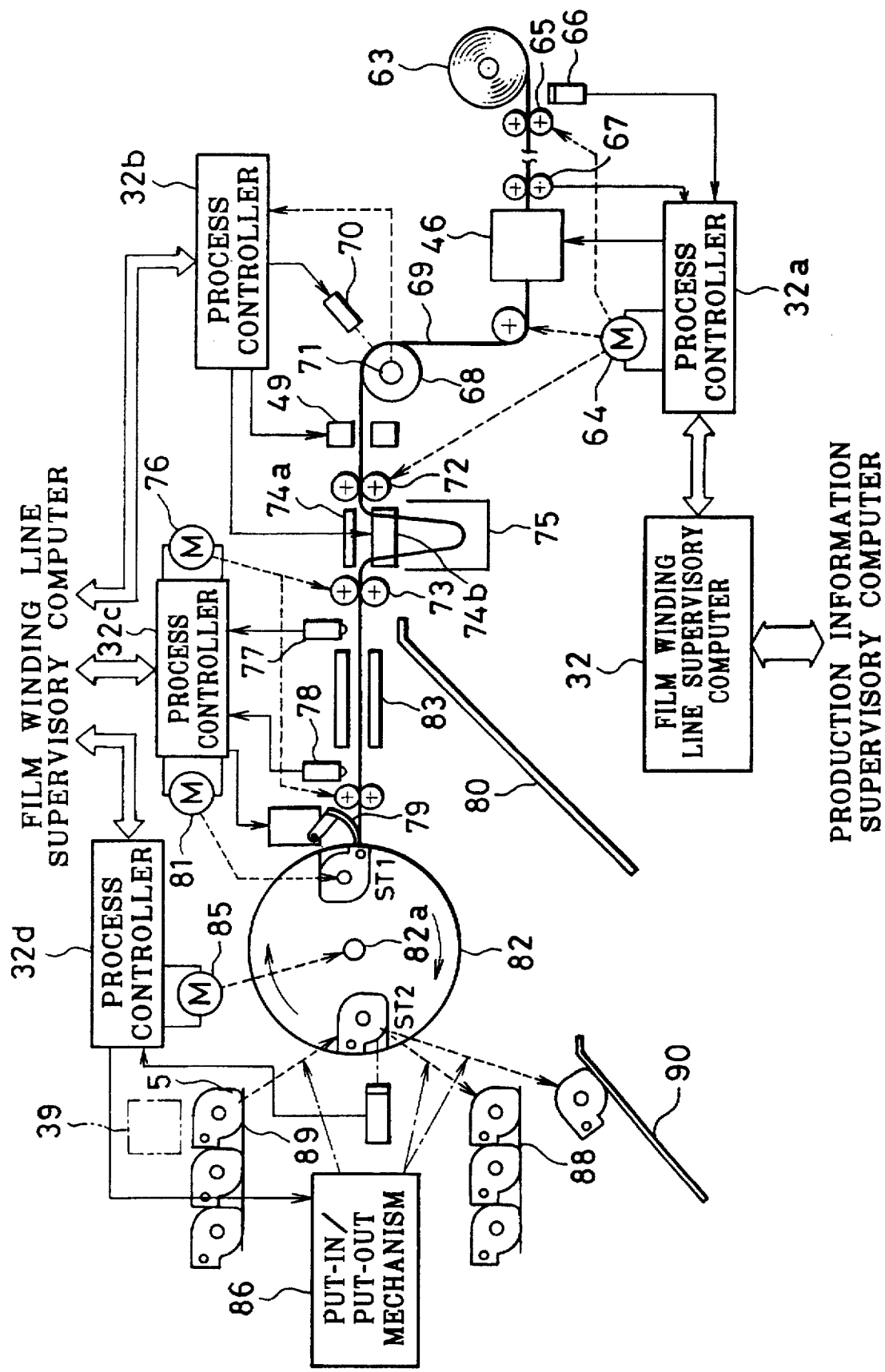

METHOD OF MANAGING INFORMATION EXCHANGED BETWEEN PRODUCTION INFORMATION SUPERVISORY COMPUTER AND LINE SUPERVISORY COMPUTERS FOR PRODUCTION OF PHOTO FILM CARTRIDGE

BACKGROUND OF THE INVENTION

1. Field of the Invention

The present invention relates to an information management method for managing information about production or manufacture of photo film cartridges, each of which contains a roll of photo filmstrip in a light-tight cartridge shell. More particularly, the present invention relates to a production information management method, by which the operation of production facilities for the photo film cartridges is efficiently controlled, and various kinds data obtained from these facilities are efficiently utilized for manufacturing the photo film cartridges.

2. Background Arts

Photo film cartridge containing a roll of photo filmstrip in a light-tight cartridge shell are widely used for photography. The photo film cartridges can be sorted into various types according to the film speed, the number of available exposures, whether it is a color film or a black-and-white film, etc., so that photographers may chose appropriate types in accordance with their needs or intentions. To show the type of each photo film cartridge, information or indicia is printed on the cartridge shell and on the packaging casket, e.g. a cardboard box. The indicia on the casket and the cartridge shell must precisely indicate the type of photo filmstrip contained therein. Accordingly, it is necessary to supervise the production process of the photo film cartridges so as to prevent confusion between different type parts, that is, prevent combining a filmstrip with a different type cartridge shell or a different type casket.

For such production management, papers, e.g. slips, labels and books, have been popularly used. First when manufacturing the filmstrip, an emulsion, whose type is determined according to a production plan, is applied on one surface of a wide web of base film, to produce a master roll. Next the master roll is slit into continuous strips of a constant width. The continuous strips are each individually formed into a roll, and a label is attached to the roll, indicating the number of the emulsion used, the production date and time, the production lot number and other data about the rolled continuous strip. On the other hand, the cartridge shells and the caskets are produced with indicia indicating a film cartridge type determined according to the production plan. The productions are collected in containers according to the kind of parts, the production date, and the production lot number. A label indicating the production date and the production lot number is attached to each container in the same way as the productions.

Since the film cartridge type is assigned to the respective parts, i.e., the continuous strips, the cartridge shells and the caskets, in the respective production stages, it is possible to correlate the film cartridge type with the production lot numbers of the respective parts, for example, by use of a parts management table. Thereby, the production management department can designate the film cartridge type to produce by the production lot numbers of the respective parts. With reference to the production lot numbers on a production order slip issued by the production management department, the manufacture department can chose an appropriate kind of parts by identifying the production lot numbers indicated by the labels on the containers. The chosen parts are supplied to the respective production apparatuses on the manufacture lines.

In order to improve the efficiency of the paper-based production management, the way to utilize computers for the production management has been studied. Generally, production facilities for photo film cartridges consist of a plurality of manufacture lines. Therefore, disposing a line supervisory computer in each of the manufacture lines make it possible to check if the parts supplied to each line are proper or not. By entering data of the production lot numbers of the parts and production conditions into the line supervisory computers with reference to the production order slips issued from the production management department, it is possible to check the production lot number of the parts as being supplied to each production apparatus, or setup conditions of each production apparatus prior to actuation.

The production conditions include production conditions and inspection conditions. As examples of the production conditions, the length of individual filmstrips to be cut from the continuous strip, and side-printing format for printing an ID number and frame serial numbers on the sides of each individual filmstrip are designated according to the type and the number of available exposures of the photo film cartridges to produce. As the inspection conditions, there are threshold data for appearance tests and performance tests, timing data and sampling number data for sampling inspection, and so forth.

The setup data of the production conditions and the inspection conditions used for each kind of parts is entered in the books along with the production date data. Alternatively, hard copies of the setup data are printed out from a terminal computer, and are stored with the books. This allows to trace the records or history of any photo film cartridge after the shipment, such as the production conditions and the inspection conditions used for the photo film cartridge, if only the production lot number is determined. Therefore, storing the setup data in or with the books is very useful for the quality management or supervisory. After storing the setup data, the production apparatuses are actuated to manufacture and pack the photo film cartridges in accordance with production order table.

Recently, a new type photo film cartridge, called IX 240 type or Advanced Photo System type, was brought into market. The new type uses completely different cartridge shell and filmstrip from those of the conventional ISO 135 type. The new cartridge shell is constituted of a pair of plastic shell halves, a spool, a light shielding door and other plastic parts, and functions such that the leader of the filmstrip fully wound into the cartridge shell is advanced out of the cartridge shell responsive to unwinding rotation of the spool.

As described above, when manufacturing various types photo film cartridges, parts management is necessary to sort the parts and the packages of the photo film cartridges and chose correct parts and packages in accordance with the film cartridge type. Especially in the production facilities for IX 240 type photo film cartridge, which consists of a lot of parts and some of them vary depending upon the filmstrip format, the parts management can be complicated. According to the conventional paper-based production management method, management of an increasing number of papers themselves can be time- and labor-consuming: It is necessary to write setup data in the papers along with the other production information, or preserve hard copies of setup data in association with the papers containing other information. The operators can misread the information on the papers, especially when the film cartridge type to produce should be changed on a manufacture line.

Regarding the setup of the production conditions and the inspection conditions on the line supervisory computers in the respective manufacture lines, data input operation can be time- and labor-consuming, as the number of film cartridge types increases, or as the installation number of production apparatuses increases for a larger scale of mass-production. Moreover, when to change the production conditions or the inspection conditions, that is often necessary if any parts are disqualified in an inspection step, manual revising of the setup data in the line supervisory computers is also time- and labor-consuming, and can cause setup errors.

In addition, since IX 240 type photo film cartridges after development are expected to be returned to the photographer with the developed filmstrip rewound into the same cartridge shell as before, each cartridge shell is provided with the same ID number as the filmstrip contained therein. Accordingly, it is necessary to correlate the ID numbers of the filmstrips with those of the cartridge shells precisely one by one during the manufacture. To make this correlation on the conventional paper-based system is extremely time- and labor-consuming, and lacks reliability. A single computer supervising the entire manufacture lines involves disadvantages like longer data processing time and slower response with the increasing number of manufacture lines or manufacture steps or parts of the article.

SUMMARY OF THE INVENTION

In view of the foregoing, a primary object of the present invention is to provide a production information management method for the manufacture lines which are used for manufacturing and packaging various types photo film cartridges, wherein confusion between different type parts is prevented by an efficient parts management, production management information obtained during the manufacture is collected and stored with accuracy, and ID numbers are given to the filmstrips, the cartridge shells and the caskets to permit one-to-one correlation between these elements without the need for complicated production process.

To achieve the above and other objects and advantages, the present invention provide a method of managing information about production of various types photo film cartridges, wherein there is a first production line for producing cartridge shells and a second production line for producing and winding filmstrips individually into the cartridge shells to produce the photo film cartridges, the method comprising the steps of:

feeding production plan data in a production information supervisory computer, the production plan data designating a particular type and a requisite number of photo film cartridges to produce;

preparing a first set of production order data for producing cartridge shells of the particular type photo film cartridges, and a second set of production order data for producing and winding filmstrips of the particular type photo film cartridges, based on the production plan data in the production information supervisory computer;

sending the first and the second set of production order data to first and second line supervisory computers respectively;

controlling the first production line by the first line supervisory computer in accordance with the first set of production order data;

controlling the second production line by the second line supervisory computer in accordance with the second set of production order data; and sending feedback data obtained from the first and second production lines to the production information supervisory computer through the first and second line supervisory computers respectively, to control the first and second line supervisory computers to cooperate with each other by the production information supervisory computer.

To correlate ID numbers of the cartridge shells with ID numbers on the filmstrips, the present invention provides the steps of:

feeding production plan data in a production information supervisory computer;

controlling the first and second production lines in accordance with the production plan data through first and second line supervisory computers respectively;

determining a range of cartridge ID numbers based on the production plan data in the production information supervisory computer;

determining a range of film ID numbers in correspondence with the determined cartridge ID numbers in the production information supervisory computer;

sending data of determined cartridge ID numbers and data of determined film ID numbers to the first and second line supervisory computers respectively;

providing a cartridge ID number on each individual cartridge shell being produced in the first production line in accordance with the data of determined cartridge ID numbers;

providing a film ID number on each individual filmstrip being produced in the second production line in accordance with the data of determined film ID numbers;

reading cartridge ID numbers from the cartridge shells when the cartridge shells are being combined with the filmstrips in the second production line; and collating the read cartridge ID numbers with the determined film ID numbers in the second line supervisory computer, so as to confirm correspondence between the read cartridge ID numbers and the determined film ID numbers.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 7 is a schematic diagram illustrating a film winding line for producing and winding filmstrips into the cartridge shells.

DETAILED DESCRIPTION OF THE PREFERRED EMBODIMENT

Figure 1:
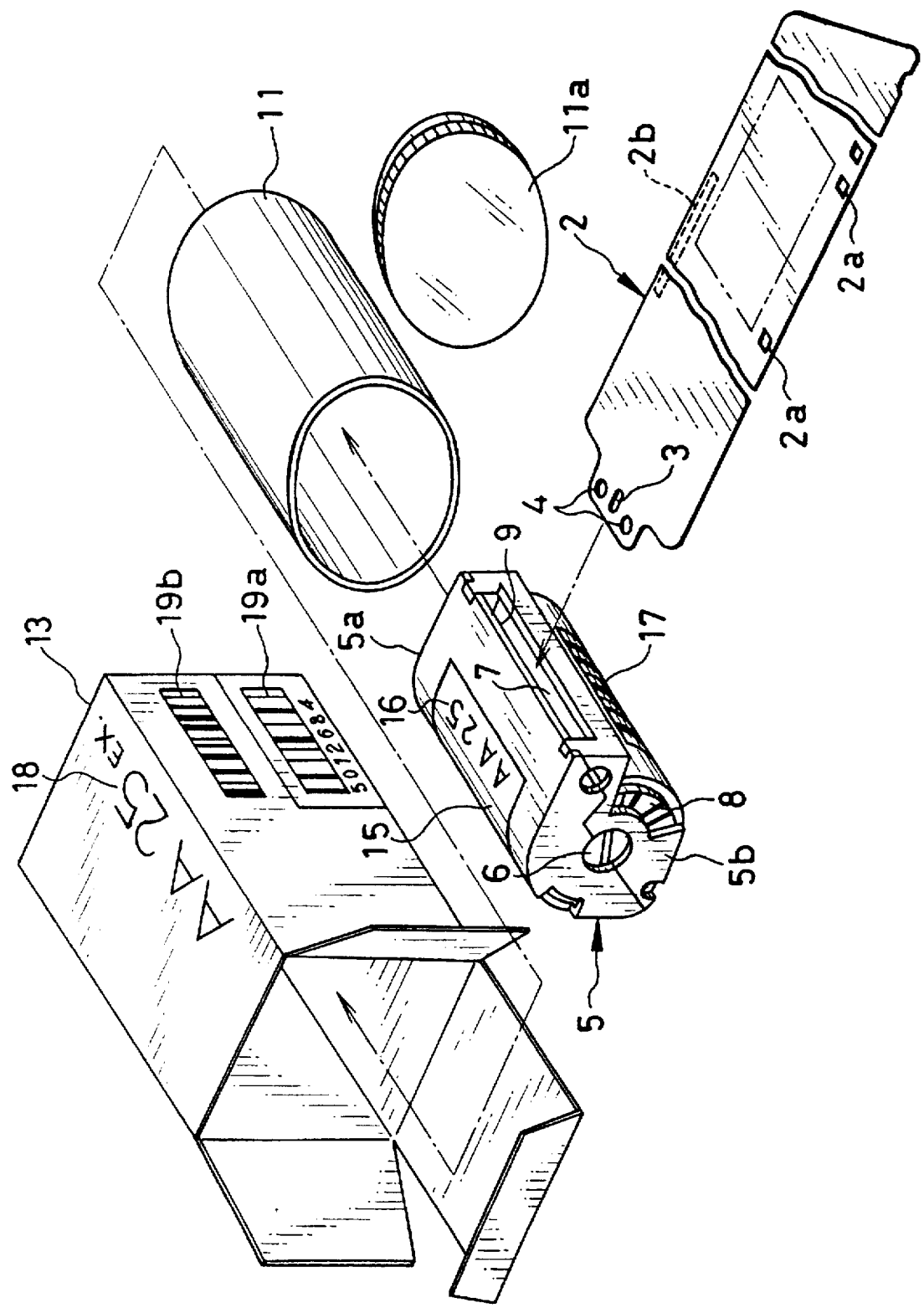
FIG. 1 is an exploded perspective view of a IX 240 type photo film cartridge and its packaging materials.

FIG. 1 shows an IX 240 type photo film cartridge, wherein a photo filmstrip 2 has a width specific to IX 240 type, and a length determined in accordance with the number of available exposures. A pair of perforations 2a are allocated to each frame such that a picture frame is photographed in a position shown by phantom lines. A fastening hole 3 and a pair of hooking holes 4 are formed through a trailing end of the filmstrip 2, at which the filmstrip 2 is fastened to a spool 6 of a cartridge shell 5.

The cartridge shell 5 consists of a pair of plastic integral shell halves 5a and 5b, the spool 6 rotatably mounted in between the shell halves 5a and 5b, a light shielding door 7, a data disc 8, and other parts which constitute leader-advancing and spool-locking mechanisms.

The light shielding door 7 is to open and close a film port 9 of the cartridge shell 5. When fastening the filmstrip 2 to the spool 6, the hooking holes 4 are hooked on a not-shown film inserter which is a movable blade with hooks, and the light shielding door 7 is opened to let the film inserter into the cartridge shell 5 through the film port 9. Then, the fastening hole 3 is engaged with a not-shown retaining claw formed on the spool 6. After the inserter is removed, the spool 6 is rotated in a winding direction to wind the filmstrip 2 into the cartridge shell 5. When the entire length of the filmstrip 2 has been wound up, the light shielding door 7 is closed to shield the interior of the cartridge shell 5 from light. This winding process is performed in a dark room. The film inserter is disclosed in more detail, e.g., in JPA 7-120889 and U.S. Pat. No. 5,573,201.

The photo film cartridge manufactured in this way is put into a plastic case 11, which is sealed with a cap 11a in a moisture tight fashion. The photo film cartridge in the plastic case 11 is packaged in a cardboard or plastic casket 13 for sale. A label 15 is attached to the periphery of the cartridge shell 5. The label 15 is provided with literal indicia 16 about the film cartridge type such as the film type, the film speed, the number of available exposures, color or monochrome, and other necessary information. The label 15 further has a bar code 17 representative of an ID number of the cartridge shell 5. The cartridge ID number is to coincide with a film ID number which is recorded as a photographic latent image on a given side portion 2b of the filmstrip 2.

The casket 13 has literal indicia 18 about the film cartridge type, and bar codes 19a and 19b printed thereon. The photographer can see the film cartridge type and other necessary information from the literal indicia 16 and 18. The bar code 19a represents a package ID number which is to coincide with the cartridge ID number. Alphanumeric indicia of the package ID number is printed along with the bar code 19a, so as to permit visual confirmation of the package ID number. Also, alphanumeric indicia of the cartridge ID number is printed along with the bar code 17 for the visual confirmation of the cartridge ID number, though it is omitted from the drawings. The other bar code 19b represents the film cartridge type like the literal indicia 16 and 18, so as to permit automatic reading the film cartridge type in the factory.

Figure 2:
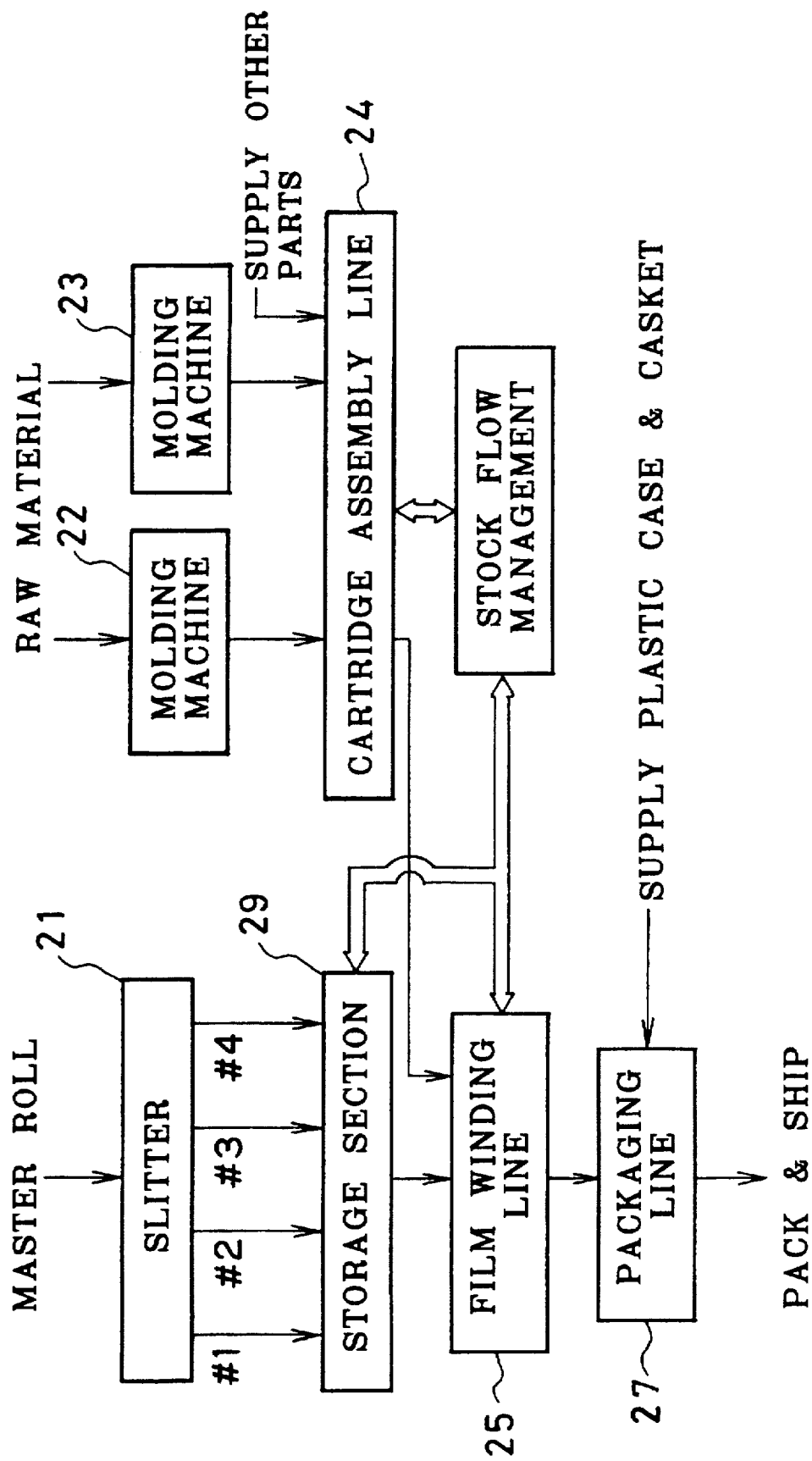
FIG. 2 is a functional block diagram illustrating the overall production processes of the photo film cartridges of IX 240 type.

FIG. 2 schematically shows the overall process from the manufacture to the shipment of the above photo film cartridge. A master roll is formed by coating a surface of a wide base film with a predetermined emulsion. A production lot number and the number of the emulsion are provided on the reel of the master roll or on the outer end of the master roll in the form of a bar code or magnetic data. The master roll is supplied to a slitter 21, to be slit into several, e.g. four, continuous strips of the same width as the filmstrip 2. The continuous strips are respectively wound into rolls, hereinafter referred to as slit rolls. A label is attached to the reel and/or the outer end of each slit roll. On the label, a slit number indicating the original location of the slit roll in the crosswise direction of the master roll, the master roll lot number and the emulsion number are printed or magnetically recorded. The slit rolls produced from the same master roll are loaded in an automatic vehicle in a light-tight fashion, and these vehicles are stored in a dark storage section 29.

When manufacturing the cartridge shell 5, resin pellets of raw material are supplied to molding machines 22 and 23, which form the shell halves 5a and 5b as integral parts, respectively. The shell halves 5a and 5b, and other parts, including the spools 6, the light shielding doors 7, the labels 15, are sequentially supplied to a cartridge assembly line 24, to be assembled into the cartridge shells 5. These parts are loaded on parts-trays in the production lots, and the trays are sequentially supplied to the cartridge assembly line 24. The assembled cartridge shells 5 are loaded on shell-trays in a given number lots, and the shell-trays are stacked. Each individual tray has a tray ID number which is correlated to the production lot number of each part. Therefore, it is possible to trace the production history data of the cartridge shells 5, i.e. the respective production lot numbers of the parts of the cartridge shells 5, on the basis of the tray ID numbers, before the winding of the filmstrips 2.

The slit rolls and the cartridge shells 5 are supplied to a film winding line 25. The film winding line 25 forms the perforates 2a in the continuous strip, prints data on the sides of the continuous strip, and then cuts the continuous strip at the length determined depending upon the number of available exposures of the individual filmstrips 2 to produce. At the cutting, the shapes of the leading and trailing ends of the filmstrips 2 are formed, and the fastening hole 3 and the hooking holes 4 are punched through the trailing end.

In the film winding line 25, the trailing end of the filmstrip 2 is headed toward the cartridge shell 5 which is placed in a given position. The film inserter is actuated to fasten the trailing end of the filmstrip 2 to the spool 6. Thereafter, the spool 6 is rotated to wind up the filmstrip 2 completely into the cartridge shell 5. By closing the light shielding door 7, the photo film cartridge is finished as a product. Then, the photo film cartridge is supplied to a packaging line 27, to be packaged with the plastic case 11 and the casket 13. The caskets 13 containing the photo film cartridges are wrapped up in cellophane sheet and/or packed in corrugated cardboard boxes in groups of a given number, for shipment. Some types photo film cartridges are encased in pairs or in groups of three or more in larger size caskets.

Figure 3:
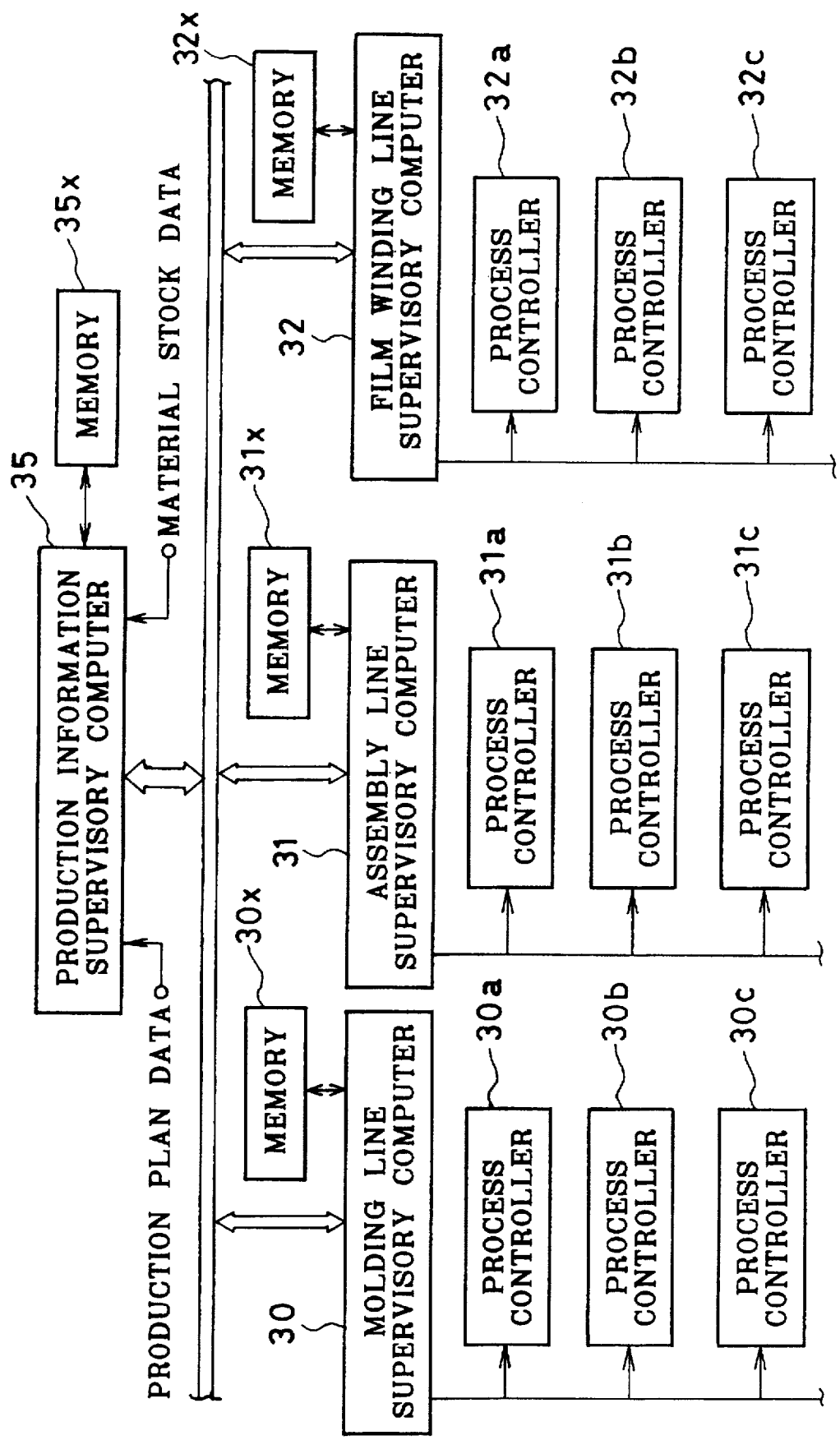
FIG. 3 is a block diagram illustrating data communications between computers and process controllers in the production facilities of the photo film cartridges.

In order to permit choosing the parts in the respective processes efficiently and properly in accordance with the production plan or order, and retrieving the production history data of the individual photo film cartridges accurately based on the respective ID numbers, the respective production apparatuses, i.e. the slitter 21, the molding machines 22 and 23, the cartridge assembly line 24, the film winding line 25 and the packaging line 27, are totally managed by a production information supervisory computer 35, as is shown in FIG. 3.

In FIG. 3, a molding line supervisory computer 30, an assembly line supervisory computer 31, and a film winding line supervisory computer 32 are line supervisory computers provided for controlling the respective production apparatuses each individually. In the molding machine 23, for example, it is necessary to perform a plurality of processes in a sequential fashion: supplying raw material, heating, injection, cooling and removal from the mold. Process controllers 30a, 30b, 30c . . . are provided for maintaining these processes under proper conditions, and control the raw material supply amount, the temperature, the injection pressure, the cooling time, the mold removal speed and so forth in response to commands from the molding line supervisory computer 30.

In the cartridge assembly line 24, pallets are successively circulating around the cartridge assembly line 24, and each pallet receives one of the shell halves 5b supplied from the molding machine 23. While the pallet makes one cycle, other parts such as the spool 6, the light shielding door 7 and the shell half 5a from the molding machine 22 are sequentially mounted to the shell half 5b on the pallet, and the label 15 is attached to the cartridge shell 5. In order to perform these processes properly, process controllers 31a, 31b, 31c . . . control the conveying speed of the pallets, and control actuators of robotics, e.g. motors, air cylinders and oil cylinders.

In the film winding line 25, the continuous strip is withdrawn from the slit roll at a constant speed, and is transported through a perforator and a side-printer. Thereafter, the continuous strip is cut into the filmstrips 2. On the other hand, the cartridge shells 5 are set in a turn table, so that the filmstrips 2 are seriatim fastened to the spools 6 of the cartridge shells 5 by use of the film inserter, and are wound up into the respective cartridge shells 5. These winding steps are respectively controlled by process controllers 32a, 32b, 32c . . . in response to commands from the film winding line supervisory computer 32.

In this way, the line supervisory computers 30 to 32 constitute interprocess networks with the process controllers within the respective manufacture lines, to manage the respective processes to be carried out properly in the individual production apparatuses. In addition, data obtained through the process controllers is fed back to the line supervisory computer 30, 31 or 32, and is stored in a respective memory 30x, 31x or 32x for each manufacture line. The data obtained through the process controllers includes performance data and inspection data, e.g. the number of assembled products or semi-products, the number of qualified products, the number of disqualified products, and other data obtained through those process controllers which are used for controlling inspection processes. Thereby, it is possible to monitor the data about operational conditions of the respective processes of the respective manufacture lines at any time through the line supervisory computers 30, 31 and 32.

Like the molding line supervisory computer 30, the assembly line supervisory computer 31 and the film winding line supervisory computer 32, a line supervisory computer is disposed for each manufacture line. These line supervisory computers are supervised by the production information supervisory computer 35, so that they constitute an interfactory network. The production information supervisory computer 35 provides production order information and commands for setting up production conditions and inspection conditions each individually to the line supervisory computers. For this purpose, production plan data, stock plan data about flow-in flow-out plans of the stocks of the respective materials, i.e. the raw materials and the parts, and material stock data about the actual stocks are fed in the production information supervisory computer 35, and are stored in a memory 35x. The production plan data and the stock plan data are entered through a keyboard of the production information supervisory computer 35 or is read from a recording medium like a magnetic disc. The material stock data may be entered through the keyboard, or may be fed from the line supervisory computers 30 to 32.

The memory 35x of the production information supervisory computer 35 previously stores prescription tables which are respectively prepared for the potential photo film cartridge types to produce in the factory. Each prescription table stores prescription data such as the types of the materials and parts, production conditions and inspection conditions necessary for producing a particular type photo film cartridge. A product short name, which is given to each film cartridge type, is written in the corresponding prescription table.

Figure 4:
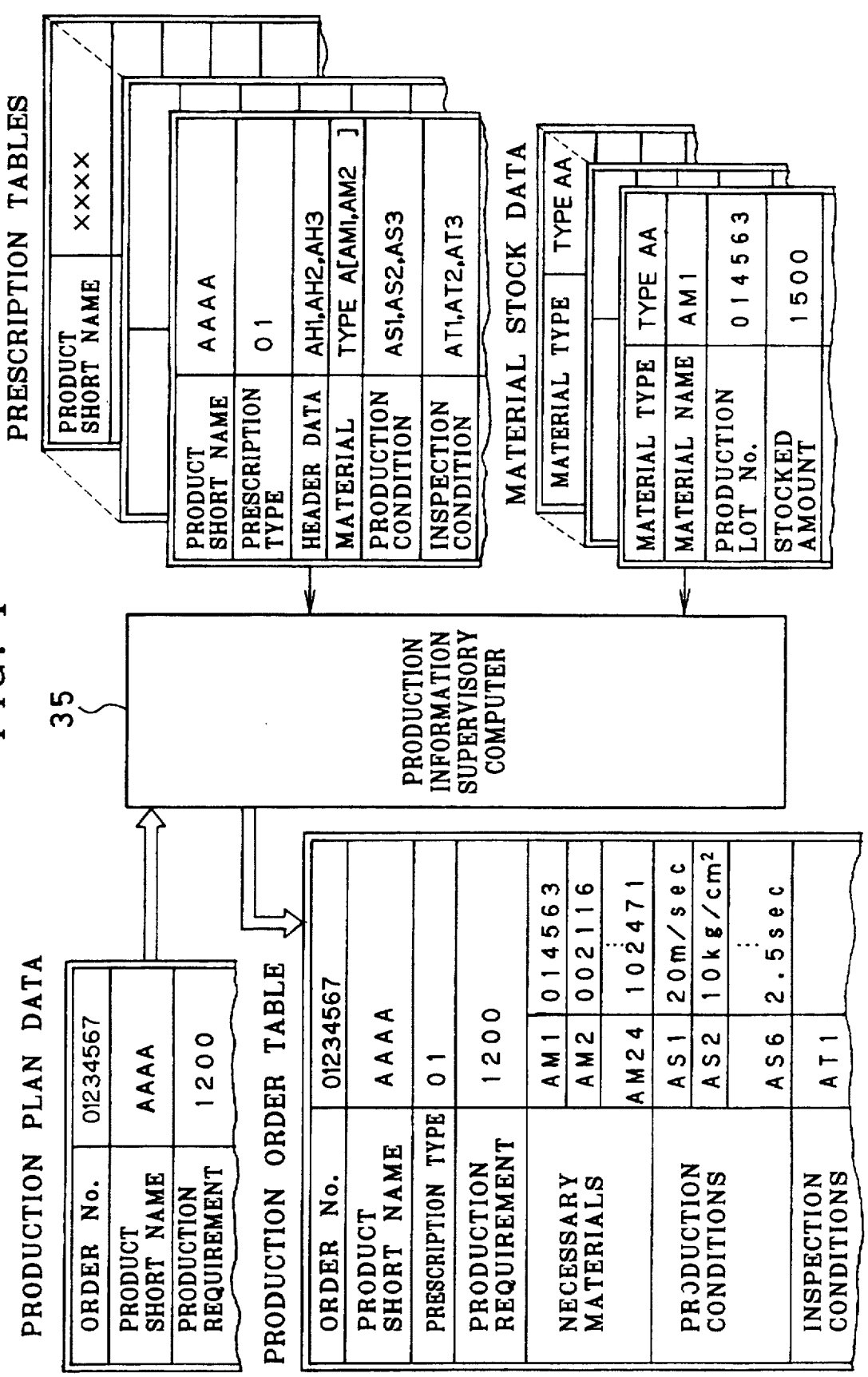
FIG. 4 is an explanatory view illustrating data formats of data fed in and fed out a production information supervisory computer.

The production information supervisory computer 35 produces a common production order table upon receipt of production plan data. Referring to FIG. 4, the production plan data includes the order number, the product short name of the film cartridge type to produce, the requisite number of cartridges to produce, and so forth. The production information supervisory computer 35 retrieves prescription data from the prescription table based on the product short name, e.g. "AAAA", that is included in the production plan data. Thus, the prescription type or number, the types and names of the materials and parts, production conditions and inspection conditions necessary for producing the photo film cartridge type "AAAA" are determined.

After the types and names of the necessary materials and parts are determined, the production information supervisory computer 35 accesses to the material stock data to display stock data on a monitor screen, to permit checking if there are enough materials in stock to produce the designated type photo film cartridges up to the requisite production number designated by the production plan. If any of the necessary materials is short in stock, the monitor screen displays along with the production plan data the name of the material in short and the shortage compared with the production plan, and the maximum number of the photo film cartridges that can be produced at present. The prescription table also stores header data as supplementary data, e.g. the necessary mark-up of the actual production number on the requisite production number, which is to take the risk or estimated rejection rate and operating factor into account.

When it is confirmed that the stock of all necessary materials is sufficient, the production information supervisory computer 35 produces the common production order table. In the common production order table, the prescription type, the production number, the names of the materials to use, the production conditions and the inspection conditions are assigned to an order number and the product short name of the film cartridge type. Some items are fixedly determined according to the film cartridge type, and other items are variable. For example, the name and the requisite number of each material are automatically determined by the film cartridge type. The production lot numbers of the respective materials and some of the production and inspection conditions may be set up optionally. Thus, by designating their production lot numbers, it is possible to choose those materials which are determined to be optimum in view of their production histories, so that a flexible measure can be taken for quality stabilizing. These optionally variable items can be set up manually in the production information supervisory computer 35 or through the line supervisory computers. When the optional items are set up through the line supervisory computers, the setup data is fed back to the production information supervisory computer 35.

All the common production order tables are stored in the memory 35x of the production information supervisory computer 35. The production information supervisory computer 35 sorts out various kinds data pieces in the common production order table, such as the names of the materials selected and their production lot numbers, the production conditions and the inspection conditions, for the respective manufacture lines, and sends them along with the order number, the product short name, the prescription type and the production number to the line supervisory computers for the respective manufacture lines. For example, the assembly line supervisory computer 31 for controlling the cartridge assembly line 24 receives the names of the materials or parts to assemble the cartridge shell 5 and their production lot numbers, and the production conditions and the inspection conditions for the cartridge assembly line 24 in the form of an individual production order table. Then, the assembly line supervisory computer 31 displays the individual production order table on its monitor screen, and sends commands to the respective sections of the cartridge assembly line 24 to adapt to the determined production and inspection conditions.

As described above, the production information supervisory computer 35 controls the respective line supervisory computers through the inter-factory network, produces and stores common production order tables in accordance with production plan data, produces individual production order tables for the respective manufacture lines and sends them to the corresponding line supervisory computers. After the manufacture lines start operations, performance data is fed from the manufacture lines back to the production information supervisory computer 35, which then stores the performance data along with the common production order table. Disposing of the line supervisory computer in each manufacture line so as to give separate functions from each other, and controlling the line supervisory computers by the common production information supervisory computer 35 permit high-speed precise data processing without the need for an extreme load on a particular computer, and also facilitate extending the manufacture lines.

Since the line supervisory computers are able to communicate with the process controllers of the associated manufacture line in a real time fashion, a quick response is possible to any requirement for change in local conditions without the need for the production information supervisory computer 35. In addition, it is possible to display data on the monitor screen of each manufacture line in the most convenient and efficient way. By connecting terminal apparatuses to the inter-factory network, it is possible to access to the production information supervisory computer 35 through the terminal apparatus, it becomes possible to monitor the latest production progress and the present production plan, as well as the past production performance.

Since not only the operations of all the manufacture lines is under the control of the production information supervisory computer 35, but also the performance data and the production history data such as the kind of materials used for processing and assembling and their production lot numbers are fed back from the line supervisory computers to the production information supervisory computer 35, the production management department can totally control the operations of all the manufacture lines, and can easily retrieve the performance data from all the manufacture lines. Because the production information supervisory computer 35 is accessible through the line supervisory computers, it is possible to make good use of experimental data obtained in practice in the production department, for example, for setting up production conditions or inspection conditions.

Since the line supervisory computers receive the individual production order tables from the production information supervisory computer 35, and the fixed items are automatically determined according to the production plan data, the labor consumption is remarkably reduced compared with the conventional method wherein setup data for the production conditions is entered individually into each of the line supervisory computers. Accordingly, man-caused failures or errors are minimized.

Figure 5:
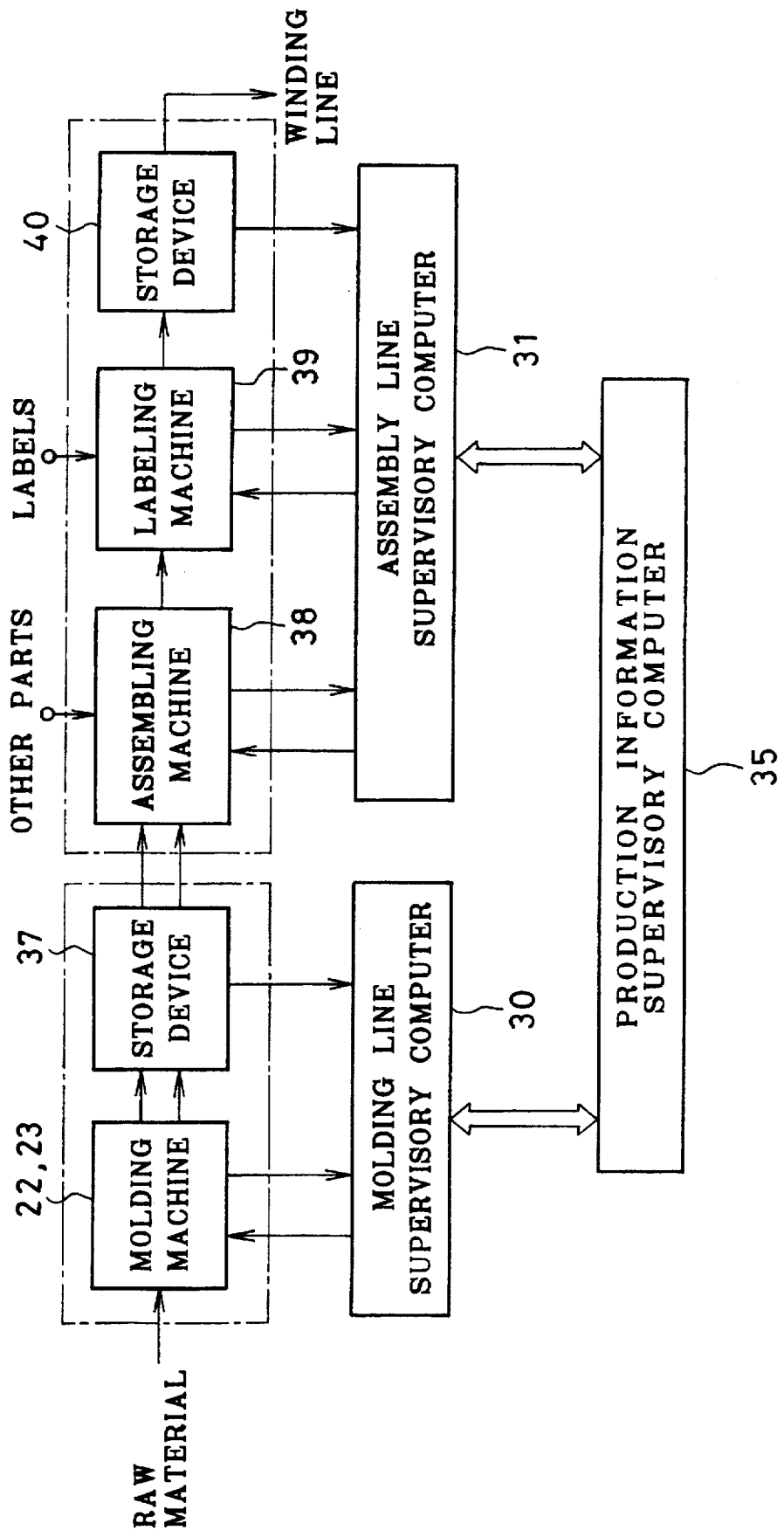
FIG. 5 is a functional block diagram illustrating processes for producing cartridge shells.

Now, the information supervisory operation over the communication between the molding line supervisory computer 30 and the assembly line supervisory computer 31 and the respective production apparatuses will be described with reference to FIG. 5. Among the data contained in the common production order table produced in the production information supervisory computer 35, those directed to the molding machines 22 and 23 are sent as individual production order tables to the molding line supervisory computer 30, and are displayed on its monitor screen. The individual production order tables include the amount and the production lot number of the raw material to supply to each molding machine 22 or 23, so that the raw material is automatically or semi-automatically thrown into hoppers of the molding machines 22 and 23 in accordance with the data in the individual production order tables.

Each container containing the raw material is provided with a bar code representative of the production lot number of the raw material, a resin type code and the like. The bar code is read by a bar code reader prior to feeding the container to the molding machine 22 or 23, and is sent to the molding line supervisory computer 30. The 30 decodes the bar code to determine the production lot number and compares it with the designated production lot number. The result of comparison is sent with the resin type code to the production information supervisory computer 35, to be stored as performance data.

The molding machines 22 and 23 work under those production conditions designated by the individual production order table, to form a requisite number of shell halves 5a and 5b, respectively. The formed shell halves 5a or 5b are arranged in the order of being formed on trays, a predetermined number for one tray. Every tray is provided with an individual tray ID number as a bar code label or in the form of magnetic data. The tray ID number is read in a storage device 37 each time the storage device 37 receives the tray with the predetermined number of shell halves 5a or 5b. The tray ID number is sent from the storage device 37 to the 30. The 30 correlates the tray ID number with other production data pieces, including the production date of the shell halves 5a or 5b arranged on that tray, the production lot number and the resin type code of the raw material and the production conditions used for these shell halves 5a or 5b. The data thus obtained is sent with the order number of the production plan data to the production information supervisory computer 35, to be stored in the memory 35x.

The assembly line supervisory computer 31 manages the processes of the cartridge assembly line 24 including an assembling machine 38, a labeling machine 39 and a storage device 40 through the process controllers 31a, 31b and 31c, which are incorporated into the assembling machine 38, the labeling machine 39 and the storage device 40, respectively. In the same way as for the molding line supervisory computer 30, the production information supervisory computer 35 inputs the individual production order table into the assembly line supervisory computer 31. Each time the production information supervisory computer 35 receives the tray ID number data from the storage device 37, the production information supervisory computer 35 sends the assembly line supervisory computer 31 a tray ID number of the tray to be forwarded to the assembling machine 38 next.

The assembly line supervisory computer 31 inputs a tray request signal including the tray ID number into the assembling machine 38. Then, the assembling machine 38 sends the tray request signal to an automatic vehicle, so that the vehicle takes out the tray having the designated tray ID number from the storage device 37, and carries it to the assembling machine 38. The assembling machine 38 starts assembling the cartridge shell 5, while picking up the shell halves 5a and 5b one by one from the trays.

In the same way as for the shell halves 5a and 5b, the spools 6, the light-shielding doors 7 and other parts of the cartridge shell 5 are supplied to the assembling machine 38 from the respective parts suppliers. The production lot numbers and the supply number of these parts are determined and sent to the assembly line supervisory computer 31 through the assembling machine 38. The assembling machine 38 assembles these parts into the cartridge shells 5 under the production conditions designated by the individual production order table. The cartridge shells 5 are subjected to an appearance inspection through a video inspection device that is disposed in the assembling machine 38, and rejected ones are eliminated.

Conditions for the appearance inspection, such as whether it is total inspection or sampling inspection, what sampling conditions should be set if it is sampling inspection, and the threshold value as the acceptance criterium, are automatically setup in accordance with the individual production order table from the production information supervisory computer 35. The inspection data including the rejection rate and inspection measurement values, is fed back as performance data to the production information supervisory computer 35 through the assembly line supervisory computer 31.

The labeling machine 39 attaches the label 15 to the cartridge shell as being supplied from the assembling machine 38, for example, in the way as disclosed in U.S. patent application Ser. No. 08/620,345. The labels 15, each of which has the literal indicia 16 indicating a film cartridge type, the bar code 17 representative of a cartridge ID number, and the alphanumeric indicia of the cartridge ID number printed thereon, are arranged in series on a releasing paper. The releasing paper with the labels 15 is wound into rolls, and the label rolls are supplied to the labeling machine 39. The labels 15 are seriatim peeled off the label roll, and attached to the cartridge shells 5 as the cartridge shells 5 are supplied to the labeling machine 39. In this way, a cartridge ID number is assigned to each cartridge shell 5 as a serial number in accordance with the time sequence the cartridge shell 5 is produced, or another regular sequence.

The production information supervisory computer 35 controls the range of the cartridge ID numbers that are assigned to the cartridge shells 5 being produced at present. Accordingly, the individual production order table includes data of the cartridge ID number range, and the production lot numbers of those label rolls which hold those labels 15 having the cartridge ID numbers of the designated range printed thereon, so that the labeling machine 39 is supplied with the corresponding label rolls. Prior to attaching the label 15 to the cartridge shell 5, the cartridge ID number is read from the label 15, and is compared with the cartridge ID numbers indicated in the individual production order table.

After being labeled, the cartridge shell 5 is optically inspected on the labeling position, and the cartridge ID number is read from the bar code 17. If the labeling position or condition is improper, the cartridge shell 5 is ejected from the line. The cartridge ID number of the ejected cartridge shell 5 is processed as a missing number, and is fed back to the production information supervisory computer 35 through the assembly line supervisory computer 31.

The cartridge shells 5 are seriatim loaded and arranged on trays in the same order as the labels 15 are attached. The trays are transferred to and stored in the storage device 40. The tray can hold the same number of finished cartridge shells 5 as the number of shell halves 5a or 5b that is allocated to one tray in the storage device 37. Accordingly, if there are rejected cartridge shells, the number of cartridge shells 5 loaded on the tray is reduced correspondingly. It is possible to use the same trays for holding the cartridge shells 5 as used for holding the shell halves 5a or 5b.

Each time the tray with the finished cartridge shells 5 arrives at the storage device 40, the tray ID number of the tray is read to be fed in the assembly line supervisory computer 31. The assembly line supervisory computer 31 checks the tray request signal that is given to the assembling machine 38 at the start of assembling these cartridge shells 5, and correlates the tray ID number of the tray arrived at the storage device 40 with the tray ID numbers of the trays used for carrying the shell halves 5a and 5b of these cartridge shells 5. Also, the production lot numbers of other parts supplied to the assembling machine 38, the production lot numbers of the label rolls supplied to the labeling machine 39, the range of the cartridge ID numbers used, and the cartridge ID numbers of the rejected cartridge shells are associated with the tray ID number of the tray in the storage device 40, as ID number data. To the ID number data is added other data including a machine type number of the cartridge assembly line 24, the production data, the production conditions, the inspection conditions, the order number, and the product short name of the film cartridge type. These data pieces are sent to the production information supervisory computer 35 through the assembly line supervisory computer 31, and is stored in the memory 35x.

In this way, the production information supervisory computer 35 can monitor the tray ID numbers of all trays stored in the storage device 40, and can trace based on the tray ID number the type of the cartridge shells 5 loaded on each tray and their production histories such as the order number of the production plan data, the raw material type, the production conditions and the inspection conditions which were used for producing these cartridge shells 5. Accordingly, even after the shipment, it is possible to trace the production history data of each individual photo film cartridge by use of the production information supervisory computer 35 if only the cartridge ID number is determined.

Figure 6:
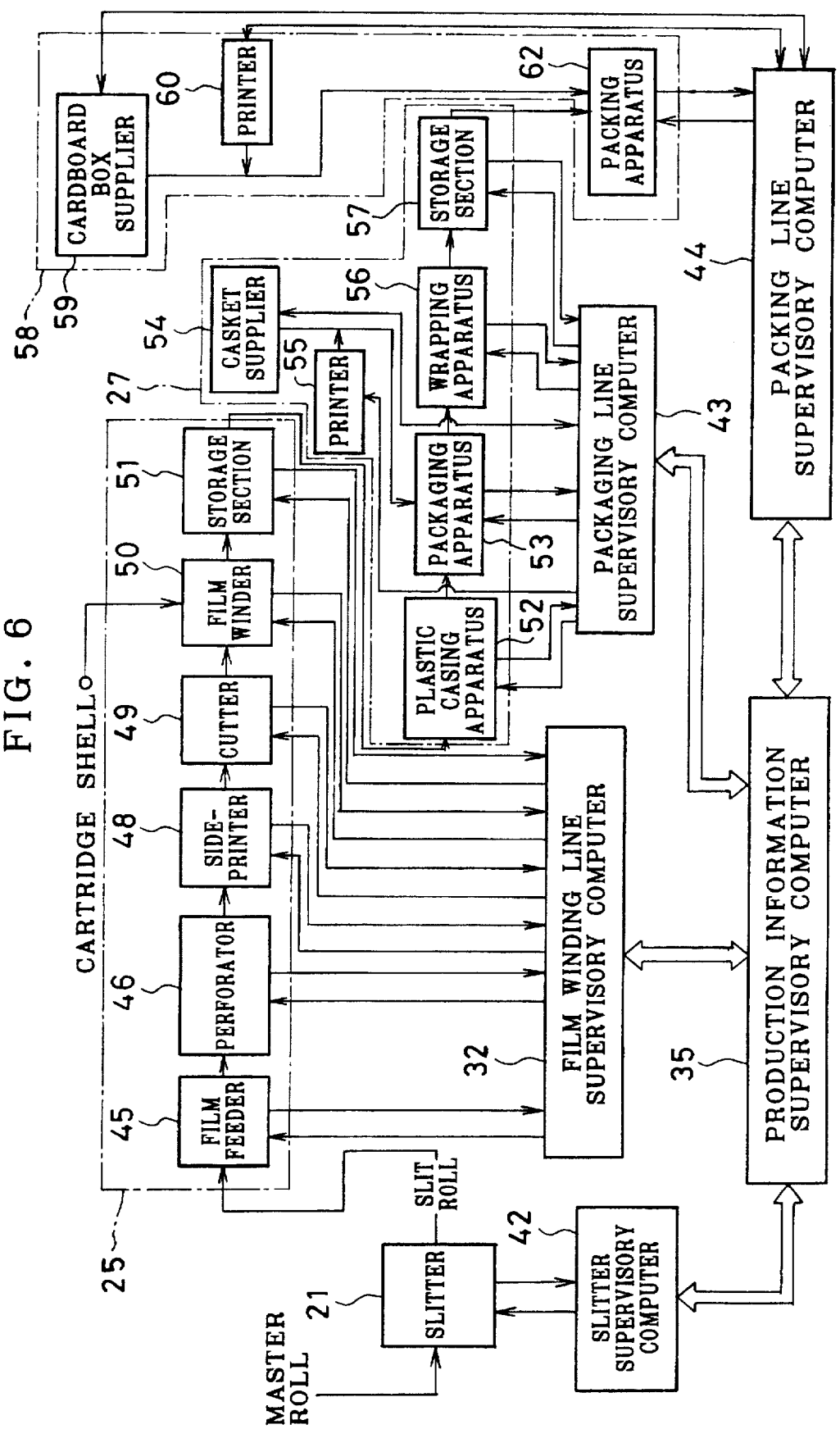
FIG. 6 is a function block diagram illustrating processes for completing and packaging the photo film cartridges.

FIG. 6 shows the information supervisory operation over the entire production process from the filmstrip manufacturing step to the packing step into the corrugated cardboard boxes. The production information supervisory computer 35 totally manages the line supervisory computers of the respective manufacture lines, including a slitter supervisory computer 42, the film winding line supervisory computer 32, a packaging line supervisory computer 43 and a packing machine supervisory computer 44. The slitter supervisory computer 42 receives an individual production order table from the production information supervisory computer 35, and displays the table on its monitor screen. The individual production order table includes production lot numbers of those master rolls which are suitable for the film cartridge type designated by the production plan data. Among the stored master rolls, the master rolls having the designated production lot numbers are selected one after another, to be loaded in the slitter 21 by use of an automatic vehicle and robotics.

The slitter supervisory computer 42 sends the slitter 21 condition setup data, e.g. the feed out speed from the master roll, inspection conditions for a surface inspector that is incorporated into the slitter 21, and so forth. Then, the slitter 21 is actuated to slit the master roll into the slit rolls having the same width as the filmstrips 2 to produce. Then, the bar code labels indicating the emulsion number, the master roll production lot number and the slit number are attached to the outer end and the reel of each slit roll. The bar code is read through an automatic bar code reader or a manual operating handy bar code reader, and the bar code data is sent to the slitter supervisory computer 42.

The film winding line supervisory computer 32 receives an individual production order table which includes the emulsion number, the master roll production lot number and the slit number of the slit roll to be used in the film winding line 25. A handling device such as a robot takes the designated slit rolls out of the storage section 29, to be set one after another in a film feeder 45 of the film winding line 25. If there remains a trailing portion of a preceding slit roll in the film feeder 45, the outer end of the newly set slit roll is spliced to the trailing end of the preceding slit roll. The bar code of the new slit roll is read to identify the slit roll. Simultaneously, performance data about the preceding slit roll is sent to the production information supervisory computer 35 through the film winding line supervisory computer 32. The film winding line supervisory computer 32 controls the film winding line 25 so as to operate under the conditions designated by the individual production order table from the production information supervisory computer 35.

A perforator 46 forms the perforations 2a through the continuous strip from the slit roll in the arrangement as shown in FIG. 1. The number of perforations 2a is defined by the number of available exposures of the film cartridge type to produce. Since the data of the available exposure number is included in the individual production order table, the film winding line supervisory computer 32 designates the number of perforations 2a to form by the perforator 46.

The continuous strip moves past the perforator 46 to a side-printer 48, wherein side-printing data is optically printed as latent images on the side of the continuous strip. The side-printing data includes bar codes of the film ID number of each individual filmstrip 2 to be made from the continuous strip, alphanumeric indicia of the film ID number, frame serial numbers, the product short name, manufacturer name, and so forth. The film data except the film ID number can be determined based on the product short name when the production plan data is input into the production information supervisory computer 35. The film ID numbers must be coincide with the cartridge ID numbers given to the corresponding cartridge shells 5 in the cartridge assembly line 24.

Therefore, when the production information supervisory computer 35 prepares the common production order table, the production information supervisory computer 35 checks the range of the cartridge ID numbers used, which is included in the ID number data received from the assembly line supervisory computer 31, to determine the range of the film ID numbers for the side-printing in correspondence with the range of the cartridge ID numbers printed on the labels 15 attached to the cartridge shells 5 in the assembly line 24. It is of course possible to determine the range of the film ID numbers first, and designate the range of the cartridge ID numbers and corresponding labels.

The range of the film ID numbers thus determined is stored along with the order number of the production plan data in the production information supervisory computer 35, and is written in the individual production order table for the film winding line supervisory computer 32. The side-printer 48 makes the side-printing in accordance with this table.

Each time the side-printer 48 prints a film ID number, the film ID number is fed back to the film winding line supervisory computer 32 together with other kinds of the side-printing data, and is collated with the film ID number designated by the individual production order table. The film winding line supervisory computer 32 associates other data obtained beforehand, such as the emulsion number, the master roll production lot number and the slit number, with the film ID number, and sends those data pieces to the production information supervisory computer 35, to be stored in the memory 35x.

After the side-printing, a cutter 49 cuts the continuous strip into the individual filmstrips 2. Since the continuous strip is advanced at a constant speed in the film winding line 25, and the advanced length is measured through a rotary encoder, it is possible to actuate the cutter 49 when the advanced length reaches a length determined depending upon the number of available exposures of the individual filmstrips 2 to produce. The production conditions for the cutter 49 are also written in the individual production order table of the film winding line supervisory computer 32.

At the cutting, the shapes of the leading and trailing ends of the filmstrips 2 are formed, and the fastening hole 3 and the hooking holes 4 are punched through the trailing end. In the film winding line 25, the trailing end of the filmstrip 2 is headed toward the cartridge shell 5 which is placed in a film winder 50. The cartridge shells 5 are supplied to the film winder 50 tray by tray, and the tray ID number is read to be entered in the production information supervisory computer 35 through the film winding line supervisory computer 32.

Since the production information supervisory computer 35 stores the cartridge ID numbers and the production history data of the cartridge shells 5 loaded on each tray in association with its tray ID number, the production information supervisory computer 35 can trace and verify not only the range of the cartridge ID numbers of the supplied cartridge shells 5, but also the order number for these cartridge shells 5 and the production lot numbers of the respective parts of the cartridge shells 5.

Immediately before the cartridge shell 5 is seriatim placed in the film winder 50, the cartridge ID number of each cartridge shell 5 is read through the bar code 17 on the label 15. The cartridge ID number is sent to the film winding line supervisory computer 32, as soon as it is read from the cartridge shell 5. On the other hand, the film winder 50 is synchronized with the side-printer 48 such that the cartridge ID number that has just been read from the cartridge shell 5 coincides with the film ID number that the side-printer 48 is about to print on the continuous strip in a length allocated to the next filmstrip 2 to produce. Accordingly, the film winding line supervisory computer 32 can collate the cartridge ID numbers with the film ID numbers immediately before the side-printer 48 prints the film ID number. The film winder 50 is also synchronized with the cutter 49 such that the filmstrip 2 having the film ID number printed thereon is combined with the cartridge shell 5 having the same cartridge ID number as this film ID number.

The cartridge ID numbers and the film ID numbers are also sent to the production information supervisory computer 35, to be collated with each other, and with the cartridge or film ID numbers written in the production information supervisory computer 35, which are designated by the production plan data to the film cartridge type to produce.

After the production information supervisory computer 35 confirms that the cartridge ID number is proper, the production information supervisory computer 35 allows the side-printer 48 to effect side-printing in accordance with the side-printing data that the side-printer 48 receives from the production information supervisory computer 35 through the film winding line supervisory computer 32. In this way, the cartridge ID number is collated with the film ID number immediately before the filmstrip 2 is wound into the cartridge shell 5, so that it is possible to prevent incoincidence between the cartridge ID number and the film ID number of the same photo film cartridge with high reliability.

Although there may be rejected cartridge shells 5 at the inspection processes on the cartridge assembly line 24, since their cartridge ID numbers are stored as the missing numbers in the production information supervisory computer 35, if any cartridge ID number, e.g. "100.002", is missing in the cartridge ID number data read from the cartridge shells 5 supplied to the film winder 50, the production information supervisory computer 35 can confirm whether it should be processed as the missing number. If so, the production information supervisory computer 35 prohibits the corresponding film ID number "100.002" from being used, so that the side-printer skips that film ID number. Data of the missing number is also stored as performance data in the production information supervisory computer 35.

The film winder 50 secures the trailing end of the filmstrip 2 to the spool 6 of the cartridge shell 5, and then rotates the spool 6 to wind up the filmstrip 2 fully into the cartridge shell 5, and then closes the light shielding door 7, thereby completing the photo film cartridge. Since the production history data of the filmstrip 2 such as the emulsion number, the master roll production lot number and the slit number, is previously known, the production history data of the filmstrip 2 is stored with the production history data of the combined cartridge shell 5 in the production information supervisory computer 35 in association with the film ID number or the cartridge ID number.

The photo film cartridges from the film winder 50 are loaded on trays each can hold a predetermined number of cartridges, and these trays are stored in a storage section 51, in the same way as in the storage device 40 of the assembly line 24. The trays are also provided with respective tray ID numbers, which are read and sent to the film winding line supervisory computer 32. The film winding line supervisory computer 32 correlates the tray ID number with the ID numbers used for the photo film cartridges, i.e. the cartridge ID numbers or the film ID numbers, loaded on the tray having that ID number, and with the missing number data and the production history data of these photo film cartridges. The film winding line supervisory computer 32 feeds the data correlated with the tray ID number back to the production information supervisory computer 35. Therefore, it is possible to retrieve, based on the tray ID number, data about the photo film cartridges stored in the storage section 51, such as their ID numbers, the film cartridge type, the production histories of their filmstrips 2 and their cartridge shells 5.

The photo film cartridges stored in the storage section 51 are sent to the packaging line 27 tray by tray, wherein each photo film cartridge is cased in the plastic case 11 by a plastic casing apparatus 52, and is packaged with the casket 13 by a packaging apparatus 53. The packaging line 27 is under the control of the packaging line supervisory computer 43, which is under the control of the production information supervisory computer 35, in the same way as other line supervisory computers. The production information supervisory computer 35 designate the production lot numbers of the plastic cases 11 in the individual production order table. The plastic casing apparatus 52 feeds back the production lot numbers of the used plastic cases 11 to the production information supervisory computer 35 through the packaging line supervisory computer 43.

The indicia 18 and the bar code 19b that indicate a film cartridge type are previously printed on the casket 13. The bar code 19a indicating a package ID number is printed by a printer 55 which is disposed in a path from a casket supplier 54 to the packaging apparatus 53. The printer 55 may be an ink-jet printer, a Laser printer, or a thermal transfer printer.

The package ID number is designated by the production information supervisory computer 35 when the production information supervisory computer 35 receives the production plan data. The printer 55 is actuated to print the designated package ID number onto the casket 13 after the packaging line supervisory computer 44 identifies the package ID number with the cartridge ID number of the photo film cartridge to be packaged in that casket 13. It is alternative possible to print the bar code 19a in advance in each casket 13, and store the range of the used package ID number in the production information supervisory computer 35 in accordance with the production lot numbers of the caskets 13, and read the bar code 19a by a bar code reader which takes place of the printer 55, so as to collate the cartridge ID number with the package ID number.

The package ID number on the casket 13 allows to retrieve the whole production history data of the photo film cartridge contained therein based the package ID number even after the photo film cartridge is shipped for sale. If any photo film cartridges on sale are found to be defective, it is possible to recover those having the same production histories as the defective ones without the need for opening their caskets 13. The package ID numbers are not necessarily identical with the respective cartridge ID numbers, if only the package ID number and the cartridge ID number are correlated with each other and stored in the production information supervisory computer 35.

The photo film cartridge packaged with the casket 13 are forwarded to a wrapping apparatus 56, and are wrapped up in cellophane sheet in groups, e.g. in groups of ten. Thereafter, parcels of the wrapped photo film cartridges are stacked up in a storage section 57 and then transferred to a packing line 58, automatically through robotics or the like. The packing line 58 consists of a cardboard box supplied 59, a printer 60, and a packing apparatus 62, and is controlled by the packing line supervisory computer 44. The packing apparatus 62 packs several parcels of the wrapped ten photo film cartridges in corrugated cardboard boxes. In this way, for example, a thousand photo film cartridge packages are packed in one box. The printer 60 prints a box ID number on each box in the form of a bar code. The printer 60 may be an inkjet printer, a Laser printer and a thermal transfer printer.

The box ID numbers are also designated by the production information supervisory computer 35, such that one box ID number is allocated to a series of package ID numbers which are printed on the thousand packages contained in one corrugated cardboard box. The relationship between the box ID number and the package ID number is stored in production information supervisory computer 35. Therefore, it is possible to retrieve based on the box ID number the range of the package ID numbers of the packages contained in each corrugated cardboard box. It is also possible to determine based on the package ID number which box contains a particular photo film cartridge. In this way, it is possible to trace the each individual product also during the transportation.

Now the overall construction and operation in the film winding line 25 will be described with reference to FIG. 7. When a slit roll 63 is set in a given position and a start signal is entered in the film winding line supervisory computer 32, the process controller 32a actuates a motor 64 and feed-out rollers 65 of the film feeder 45, to start feeding a continuous strip 69 from the slit roll 63. A bar code reader 66 reads the bar code on the label put on the outer end of the continuous strip 69, so that data of production history of the slit roll 63 is entered through the process controller 32a into the film winding line supervisory computer 32. The film winding line supervisory computer 32 collates the production history data of the slit roll 63, such as the emulsion number, the master roll production lot number and the slit number, with those designated by the individual production order table from the production information supervisory computer 35.

The motor 64 also rotates feed rollers of a transport path of the continuous strip 69, to advance it to the perforator 46 first. The process controller 32a controls the operation of the perforator 46, while monitoring the advanced length of the continuous strip 69 through a measuring roller 67. So the perforator 46 forms the perforations 2a through the continuous strip 69 in accordance with the number of available exposures assigned to the film cartridge type designated by the individual production order table.

Thereafter, the continuous strip 69 is fed to a printer drum 68. A printer head 70 of the side-printer 48 is arranged to face the emulsion surface of the continuous strip 69 around the printer drum 68. The printer head 70 has an array of photo emission diodes extending across the continuous strip 69, and a condenser lens system for forming images on the side portions of the continuous strip 69. The process controller 32b controls the side-printer 48. The printer drum 68 is accompanied by an rotary encoder 71 to measure the advanced length of the continuous strip 69 at each side-printing. The measured length is fed back to the process controller 32b. The side-printer 48 may preferably be those disclosed in JPA 6-130548.

Thus, the continuous strip 69 is recorded with side-printing data as photographic latent images. The side-printing data includes the product short name, manufacturer name, frame serial numbers, bar codes of the film ID number of each individual filmstrip 2 to be made from the continuous strip, alphanumeric indicia of the film ID number. The side-printing data is included in the individual production order table which the film winding line supervisory computer 32 receives from the production information supervisory computer 35. After each side-printing, the side-printing data having been printed is fed back to the production information supervisory computer 35 through the film winding line supervisory computer 32, and is stored as performance data.

The continuous strip 69 with the side-printing data recorded thereon is fed to the cutter 49. The cutter 49 consists of a movable edge and a stationary edge, to cut the continuous strip 69 into individual filmstrips 2 whose length is designated by the process controller 32a according to the number of available exposures assigned to one filmstrip 2. The advanced length of the continuous strip 69 measured by the rotary encoder 71 is also sent to the process controller 32a through the process controller 32b, so that the motor 64 pauses while the cutter 49 performs cutting. Simultaneously with the cutting, the cutter 49 shapes the leading end of the just cut filmstrip 2 and the trailing end of the filmstrip 2 next to be cut off the continuous strip 69, and punches the fastening hole 3 and the hooking holes 4 through the trailing end. The filmstrip 2 is then transported toward the film winder 50 with the trailing end in the lead.

There are disposed an upper stationary guide plate 74a and a downward movable guide plate 74b between a first pair of feed rollers 72 and a second pair of feed rollers 73. The movable guide plate 74b includes two pivotal flaps whose respective axes extend in the film transporting direction, so that the guide plate 74b serves as a door to open or close an entrance of a film loop chamber 75. When the trailing end of the filmstrip 2, that is, a front end in the film transporting direction, reaches the second pair of feed rollers 73, the movable guide plate 74b is opened to form a loop of the filmstrip 2 in the film loop chamber 75. The first pair of feed rollers 72 is driven by the motor 64, so that they stops rotating while the cutter 49 performs cutting. The second pair of feed rollers 73 are driven by another motor 76 which is under the control of the process controller 32c for the film winder 50. The film loop chamber 75 is provided for absorbing the difference in the transport speed between the first pair of feed rollers 72 and the second pair of feed rollers 73.

A another pair of film guide plates 83 is disposed downstream from the second pair of feed rollers 73. First and second infrared reflective photo sensors 77 and 78 are disposed before and behind the film guide plates 83, respectively, to output a low level signal to the process controller 32c while they receive light reflected from the continuous strip 69, and a high level signal while no light is received. Thus, the process controller 32c can determine when the ends of the filmstrip 2 pass under the respective photo sensors 77 and 78. The lower one of the film guide plates 83 is also movable upon a command from the process controller 32c, so as to eject defective filmstrips 2 or fragments of filmstrip 2 from the film winding line 25 through a chute 80.

The process controller 32c also controls a film inserter 79 of the film winder 50. The film inserter 79 is disposed at a first station ST1 of a turn table 82 at which an empty cartridge shell 5 is standby. At the first station ST1, the spool 6 of the empty cartridge shell 5 is engaged with a not-shown drive shaft that is driven by a motor 81, and the light shielding door 7 is engaged with a not-shown door drive shaft. First the spool 6 is set to a given angular position, and the film inserter 79 inserts the trailing end of the filmstrip 2 through the film port 9 to secure the trailing end to the spool 6. The process controller 32c controls the motor 81 such that the motor 81 rotates the spool 6 in a winding direction at a high speed when the loop in the film loop chamber 75 reaches a predetermined length after the trailing end of the filmstrip 2 is secured to the spool 6.

Thereafter when the first photo sensor 77 detects the leading end of the filmstrip 2, i.e. a rear end in the film transporting direction, the process controller 32c changes the speed of the motor 81 to a lower value. Thereafter when the second photo senor 78 detects the leading or read end of the filmstrip 2, the motor 81 is further driven to make a predetermined number of rotations, and is then deactivated. The number of further rotations is determined to be enough to wind up the entire length of the filmstrip 2 into the cartridge shell 5. Instead of controlling the number of rotation, it is possible to determine the time duration from the rear end detection by the second photo sensor 78 to the stop of the motor 81.

Since the diameter of the roll of the filmstrip 2 fully wound on the spool 6 increases with the increase of its length, i.e., the number of available exposures, the time duration or the number of further rotation should be determined based on the shortest filmstrip 2 to produce. Thereby, any type of filmstrip 2 can be wound up completely in the cartridge shell 5 by use of a common control sequence.

The turn table 82 is rotatable about an axle 82a, and is driven to makes a half rotation intermittently by a motor 85 which is controlled by a process controller 32d. The turn table 82 is provided with two holders for holding the cartridge shells 5. At a second station ST2, which is disposed opposite from the first station ST1 in the radial direction, a put-in/put-out mechanism 86 puts out the cartridge shell 5 having the filmstrip 2 wound up therein from the turn table 82, and puts the empty cartridge shells 5 supplied from the cartridge assembly line 24 in one of the holders. The put-in/put-out mechanism 86 is controlled by the process controller 32d. Each time the cartridge shell 5 is put on the turn table 82 at the second station ST2, a bar code reader 87 reads its cartridge ID number from the bar code 17 of the label 15, and sends the ID number to the process controller 32d.

The process controller 32d sends the cartridge ID number to the film winding line supervisory computer 32. The film winding line supervisory computer 32 then collates the cartridge ID number with a film ID number which the side-printer 49 is about to print. This film ID number is assigned to the next filmstrip 2 to be cut off from the continuous strip 69 following the filmstrip 2 that is being wound into the cartridge shell 5 at the first station ST1. Since the cartridge shell 5 just put in on the turn table 82 at the second station ST2 is determined to be combined with this next filmstrip 2, the collation of the cartridge ID number with the film ID number prior to the side-printing of the film ID number ensures preventing incoincidence between the film ID number and the cartridge ID number of the same photo film cartridge.

The cartridge ID number of each supplied cartridge shell 5 may be read at another position. For example, since the cartridge shells 5 are seriatim supplied from a supply stacker 89 to the turn table 82, and a designated series of film ID numbers are previously sent to the film winding line supervisory computer 32, it is possible to read the cartridge ID number at a predetermined position on the supply stacker 89, and collate it with one of the series of film ID numbers that corresponds in the order.

When the film winding at the first station ST1 is accomplished, the light shielding door 7 is closed, and the turn table 82 is rotated through 180 degrees, to move the cartridge shell 5 with the filmstrip 2 to the second station ST2. At the same time, the empty cartridge shell 5 is moved to the first station ST1, and the spool 6 of the empty cartridge shell 5 is engaged with the notshown drive shaft, and is set into the given angular position. Also, the light shielding door 7 is engaged with the not-shown door drive shaft.

The light shielding door 7 is open when the cartridge shell 5 is supplied to the second station ST2, and is maintained open in the first station ST1 unless the film winding step is complete.

When the cartridge shell 5 with the filmstrip 2 wound therein is moved to the second station ST2, the process controller 32d actuates the put-in/put-out mechanism 86 to transfer it from the turn table 82 to a stacker 88. A not-shown bar code reader reads the cartridge ID number from the transferred cartridge shell 5, and sends it as performance data to the process controller 32d. The performance data is stored in production information supervisory computer 35. Thereafter, the put-in/put-out mechanism 86 puts out the next empty cartridge shell 5 from the supply stacker 89 and put it in the emptied holder of the turn table 82.

Since the printer head 70 consists of an array of photo emission diodes, a print pattern that is printed on each filmstrip 2 through the printer head 70 can be determined based on current patterns and timings of drive currents applied to the photo emission diode. Based on the print pattern thus detected, it is possible to confirm the film ID number that is actually printed by the side-printer 48. Therefore, it is possible to collate the actually printed film ID number with the cartridge ID number of the cartridge shell 5 containing that filmstrip 2, or with the film ID number that is designated by the film winding line supervisory computer 32.

If any malfunction happens in the film winder 50, the put-in/put-out mechanism 86 ejects the defective photo film cartridge through a chute 90. The cartridge ID number of the ejected photo film cartridge 5 is read by a not-shown shown bar code reader, and is sent to the film winding line supervisory computer 32, to be stored as performance data in the production information supervisory computer 35.

To the supply stacker 89, the cartridge shells 5 are transported tray by tray from the storage device 40. At that time, the tray ID number is read to be sent to the production information supervisory computer 35 through the film winding line supervisory computer 32. Since the production information supervisory computer 35 stores the cartridge ID numbers of the cartridge shells 5 in association with the tray ID number of the tray that carries the cartridge shells 5, and the film winding line supervisory computer 32 receives the individual production order table that designates the appropriate range of tray ID numbers and cartridge ID numbers, those cartridge shells 5 having inappropriate ID numbers are prevented from being supplied to the film winding line 25.

As an alternative method for collating the cartridge ID number with the film ID number, the labeling machine 39, which is disposed in the cartridge assembly line 24 in the above described embodiment, may be disposed in the supply stacker 89 instead, as is shown by phantom lines in FIG. 7. In that case, the individual production order table for the film winding line supervisory computer 32 should include the production lot numbers of the label rolls whose labels have the cartridge ID numbers corresponding to the film ID numbers to be printed. Each time one of the designated film ID numbers is printed by the side-printer 48, the label 15 having the corresponding cartridge ID number is attached to the cartridge shell 5 in the supply stacker 89, that is determined to be combined with the filmstrip 2 having that film ID number.

It may be possible to check the film ID number printed on the filmstrip 2, and then print a corresponding cartridge ID number on the label is immediately before or after it is attached to the cartridge shell 5. However, in this case, if the cartridge ID number printed on the label 15 is not dried or fixed sufficiently before the cartridge shell 5 is moved onto or out of the turn table 82, the cartridge ID number is blurred or stained. The blurred or stained cartridge ID number is a certain problem especially for IX 240 type photo film cartridge whose cartridge ID number need to be automatically readable in photo-printing process.

The inspection process in the film winding line 25 will now be described. If any trouble that damages the quality of film happens in the slitter 21, or if any defective portion is detected by the surface inspection on the continuous strips formed by the slitter 21, the damaged position or the defective portion can be determined as a length or distance from the end of the continuous strip of the slit roll. The distance data is stored along with the master roll production lot number and the slit number of the slit roll having the defective portion in the production information supervisory computer 35, for use as defection data.

When it is determined based on the bar code read through the bar code reader 66 that the slit roll 63 set in the film winding line 25 has a defective portion, the cutter 49 cut off the defective portion to eliminate from the film winding line 25. Since the advanced length of the continuous strip 69 in the film winding line 25, which corresponds to the length unwound or withdrawn from the slit roll 63, is monitored through the measuring roller 67 and the rotary encoder 71, it is possible to calculate based on the defection data which of the filmstrips 2 will include the defective portion.

When the continuous strip 69 has been withdrawn from the slit roll 63 by the length indicated by the defection data, the production information supervisory computer 35 sends an elimination command to the film winding line supervisory computer 32, whereupon the side-printer 48 skips printing or prints the same side-printing data as printed on the preceding filmstrip 2. Thereafter when it is determined that the defective portion is moved past the cutter 49, the continuous strip 69 stops being transported, and the cutter 49 is activated. The film fragment thus cut off from the continuous strip 69 is ejected through the chute 80. The ejection of the defective portion is also stored as performance data in the production information supervisory computer 35 through the film winding line supervisory computer 32.

In the same way as for the slit rolls 63, any detective portions of the master rolls, which may be caused by bad coating or drying of the emulsion, can be eliminated during the slitting process or the winding process, on the basis of defection data stored in association with the master roll production lot number in the production information supervisory computer 35.

Since the filmstrip 2 of IX 240 type is provided with a transparent magnetic recording layer on the back surface from the emulsion surface, the film winding line 25 may also check the magnetic properties of the magnetic recording layer. In that case, it is preferable to classify the quality of the magnetic recording layer, for instance, into three ranks, and store the rank data in the production information supervisory computer 35. Thus, it is possible to store the rank data of each individual filmstrip 2 in association with the film ID number.

According to the above described production information managing method, the production information supervisory computer 35 stores all data used for and obtained during the production of the photo film cartridges of all types. That is, the production information supervisory computer 35 stores the production plan data, the common production order table of each film cartridge type, and the individual production order tables individually sent to the line supervisory computers. The production information supervisory computer 35 also correlates the production lot number, the production date and the type of raw material of each part of the individual photo film cartridge with the film ID number and the cartridge ID number on the basis of the tray ID number assigned to each part, and stores the production history data of each part in association with the film ID number and the cartridge ID number, which are identical or correlated with each other. Accordingly, it is possible to retrieve all production information and quality information about the individual photo film cartridge based on its cartridge ID number or film ID number even after the photo film cartridge comes on the market.

Furthermore, according to the production information managing method of the present invention, it is possible to store the date and the situation of disorders that happened in some production facilities, in the form of code data along with other production history data in the production information supervisory computer 35. Thereby, it is possible to trace when and where the disorder happened, and correlate these information with the tray ID number, as well as the film ID number or the cartridge ID number.

In addition, since environments in the factory have large effect on the quality of produced photo film, temperature, humidity and cleanness of the respective production facilities should be maintained in proper conditions. For example, if the temperature and the humidity are improper, photographic properties of the emulsion surface would be unsatisfactory. The curling tendency of the photo film varies with the variation of the temperature and the humidity, resulting in poor physical properties of the filmstrip inside the cartridge shell. Especially in IX 240 type, the poor physical properties of the filmstrip hinder the leader-advancing function. Since emulsion swarfs and film swarfs are resulted from the slitting or cutting, the swarfs can be deposited on the emulsion surface if the cleanness of the circumstance is deteriorated. Therefore, it is preferable to measure the environmental conditions in the production facilities, and feed measurement data back to the respective line supervisory computers through the process controllers, for use in controlling the environmental conditions. It is also preferable to store the measurement data in the production information supervisory computer 35.

It is preferable to periodically monitor operational conditions of the production facilities, such as variations in the power supply voltage, in the air pressure supplied to an air cylinder device for actuating the robotics, and in the voltage supplied to an ultrasonic welding apparatus which is used for securely mating the shell halves 5a and 5b, and store the data about these conditions in the production information supervisory computer 35 through the process controller and the respective line supervisory computers. Because even inevitable slight variations in the operational conditions as above may have a certain effect on the quality of the products, to say nothing of accidental or huge variations that can be caused by lightning.

Although the present invention has been described with respect to the embodiment shown in the drawings, the present invention is applicable not only to IX 240 type photo film cartridge, but also to any other type photo film cartridges including the conventional ISO 135 type. The present invention is adaptable to the production facilities for sheet films or sheet film packs each containing a plurality of sheet films.

Thus, the present invention should not be limited to the above described embodiments but, on the contrary, various modifications may be possible to those skilled in the art without departing from the scope of claims attached hereto.

What is claimed is:

1. A method of managing information for production of a plurality of different types photo film cartridges, wherein a first production line for produces cartridge shells and a second production line produces and winds filmstrips individually into said cartridge shells to produce said photo film cartridges, said method comprising the steps of:

A. providing production plan data to a production information supervisory computer, said production plan data designating a particular type and a requisite number of photo film cartridges to produce;

B. preparing a first set of production order data for producing cartridge shells of said particular type photo film cartridges, and a second set of production order data for producing and winding filmstrips of said particular type photo film cartridges, based on said production plan data in said production information supervisory computer;

C. sending said first and said second set of production order data from said production information supervisory computer to first and second line supervisory computers respectively;

D. controlling said first production line by said first line supervisory computer in accordance with said first set of production order data;

E. controlling said second production line by said second line supervisory computer in accordance with said second set of production order data; and F. sending feedback data obtained from said first and second production lines to said production information supervisory computer through said first and second line supervisory computers respectively, to control said first and second line supervisory computers so that said first and second supervisory computers cooperate with each other through said production information supervisory computer.

2. A method as claimed in claim 1, wherein there is a third production line for packaging said photo film cartridges, said method further comprising the steps of:

preparing a third set of production order data based on said production plan data in said production information supervisory computer;

providing said third set of production order data from said production information supervisory computer to a third line supervisory computer;

controlling said third production line by said third line supervisory computer in accordance with said third set of production order data; and providing feedback data obtained from said third production line through said third line supervisory computer to said production information supervisory computer, to control said third line supervisory computer to cooperate with said first and second line supervisory computers by said production information supervisory computer.

3. A method as claimed in claim 2, further comprising the steps of:

generating, when a malfunction is detected in any of said production lines, or when a defection is detected of any of products or semi-products in any of said production lines, defection data from a corresponding one of said line supervisory computers to said production information supervisory computer;

storing said defection data in said production information supervisory computer; and sending a command from said production information supervisory computer to said line supervisory computers, to eliminate those products or semi-products having said defection from said production lines.

4. A method as claimed in claim 1, further comprising the steps of:

preparing a prescription table for one of said plurality of different types of photo film cartridge types, said prescription table designating material types to supply to said first and second production lines and production conditions setup in said first and second production lines for said one photo film cartridge type;

storing said prescription tables in said production information supervisory computer;

storing material stock data about stocked amounts of respective type materials in said production information supervisory computer; and revising said material stock data each time said materials are stocked or fed out;

wherein step B comprises the steps of:

determining, in response to said production plan data, the types and necessary amounts of materials to supply to said first and second production lines for producing said requisite number of said particular type photo film cartridges with reference to one of said prescription tables that is assigned to said particular type;

collating the necessary amount with the stocked amount for each of said determined type materials with reference to said material stock data;

integrating all data necessary for producing said particular type photo film cartridges in accordance with said production plan data, into a common production order table;

producing first and second individual production order tables from said common production order table, said first individual production table consisting of those data pieces which are necessary for operating said first production line, said second individual production tables consisting of those data pieces which are necessary for operating said second production lines; and wherein step C further comprises:

sending said first and second individual production order tables to said first and second line supervisory computers respectively.

5. A method as claimed in claim 4, further comprising the steps of:

storing said common production order table in said production information supervisory computer; and storing said feedback data from said first and second line supervisory computers in association with said common production order table.

6. A method as claimed in claim 5, wherein said feedback data includes at least one of performance data and production history data, said performance data indicating the numbers of products and semi-products produced in each of said production lines, and the number of rejected products or rejected semi-products, said production history data including the types or production lot numbers of materials actually supplied to each of said production lines.

7. A method as claimed in claim 6, wherein said production history data further includes environmental condition data representing environmental temperature, moisture and cleanness of each of said production lines, and operational condition data representing supply voltage, supply air pressure and supply oil pressure used for operating each of said production lines.

8. A method of managing information for production of a plurality of different types photo film cartridges, wherein a first production line produces cartridge shells and a second production line produces and winds filmstrips individually into said cartridge shells to produce said photo film cartridges, said method comprising the steps of:

A. providing production plan data to a production information supervisory computer;

B. controlling said first and second production lines in accordance with said production plan data through first and second line supervisory computers respectively;

C. determining a range of cartridge ID numbers based on said production plan data in said production information supervisory computer;

D. determining a range of film ID numbers in correspondence with said determined cartridge ID numbers in said production information supervisory computer;

E. sending data of determined cartridge ID numbers and data of determined film ID numbers to said first and second line supervisory computers respectively;

F. providing a cartridge ID number on each individual cartridge shell being produced in said first production line in accordance with the data of determined cartridge ID numbers;

G. providing a film ID number on each individual filmstrip being produced in said second production line in accordance with the data of determined film ID numbers;

H. reading cartridge ID numbers from said cartridge shells when said cartridge shells are being combined with said filmstrips in said second production line; and I. collating said read cartridge ID numbers with said determined film ID numbers in said second line supervisory computer to confirm correspondence between said read cartridge ID numbers and said determined film ID numbers.

9. A method as claimed in claim 8, wherein step F comprises the steps of:

supplying labels with the same range of ID numbers thereon as said determined cartridge ID numbers to a labeling machine disposed in said first production line; and attaching said labels seriatim to said cartridge shells.

10. A method as claimed in claim 9, wherein one of said determined film ID numbers is provided on one of said filmstrips after it is confirmed that one of said cartridge shells that is being combined with said one filmstrip has a corresponding cartridge ID number to said one film ID number.

11. A method as claimed in claim 10, wherein a film ID number is printed on a side portion of said each individual filmstrip by a printer having a head consisting of an array of photo emission diodes, and wherein said method further comprising the steps of:

detecting current patterns of drive signals supplied to said photo emission diodes;

deriving from said current patterns printed film ID numbers actually printed on said filmstrips;

collating said printed film ID numbers with said determined film ID numbers which are determined by said production information supervisory computer, or with said read cartridge ID numbers which are read from said cartridge shells in said second production line.

12. A method as claimed in claim 11, wherein the range of said determined cartridge ID numbers coincides with the range of said determined film ID numbers.

13. A method as claimed in claim 8, further comprising the steps of:

providing feedback data obtained from said first and second production lines to said production information supervisory computer through said first and second line supervisory computers respectively, to control said first and second line supervisory computers so that said first and second supervisory computers cooperate with each other through said production information supervisory computer; and storing said feedback data in association with said read cartridge ID numbers.

14. A method as claimed in claim 13, wherein said feedback data includes performance data and production history data, said performance data indicating the numbers of products and semi-products produced in the respective production lines, and the number of rejected products or rejected semi-products, said production history data including the types or production lot numbers of materials actually supplied to the respective production lines.

15. A method as claimed in claim 14, wherein there is a third production line for packaging said photo film cartridges, said method further comprising the steps of:

providing package ID numbers on individual packaging materials before having said photo film cartridges packaged therein;

correlating said package ID numbers of said individual packaging materials with cartridge ID numbers of said packaged photo film cartridges respectively by a third line supervisory computer controlling said third production line;

sending said package ID numbers being correlated with said cartridge ID numbers to said production information supervisory computer from said third line supervisory computer; and storing said package ID numbers in said production information supervisory computer along with said feedback data in association said cartridge ID numbers.

16. A method as claimed in claim 15, wherein every predetermined plural number of said packaged photo film cartridges are packed in a box, said method further comprising the steps of:

providing a box ID number on each box;

correlating said box ID number with package ID numbers of those packaged photo film cartridges which are packed in said each box;

storing said correlation between said box ID number and said package ID numbers in said production information supervisory computer.

17. A method of managing information for production of a plurality of different types photo film cartridges, wherein a first production line produces cartridge shells and a second production line produces and winds filmstrips individually into said cartridge shells to produce said photo film cartridges, said method comprising the steps of:

A. providing production plan data to a production information supervisory computer;

B. controlling said first and second production lines in accordance with said production plan data through first and second line supervisory computers respectively;

C. determining a range of cartridge ID numbers based on said production plan data in said production information supervisory computer;

D. supplying labels with the same range of ID numbers thereon as the range of said determined cartridge ID numbers to said second production line;

E. attaching said labels to said cartridge shells when supplied to said second production line from said first production line;

F. reading individual ID numbers from said labels in said second production line;

G. printing a film ID number that coincides with one of said read ID numbers onto a side portion of one of said filmstrips being produced in said second production line; and H. before or after said one filmstrip is wound into one of said cartridge shells, collating said printed film ID number with the ID number of the label attached to said one cartridge shell.

18. A method as claimed in claim 17, wherein film ID numbers are printed on said filmstrips by a printer having a head consisting of an array of photo emission diodes, and wherein step H comprising the steps of:

detecting current patterns of drive signals supplied to said photo emission diodes while said printer effects printing on said one filmstrip;

deriving from said current patterns said printed film ID number;

collating said printed film ID number with the cartridge ID number which is read from said one cartridge shell.

19. A method as claimed in claim 18, further comprising the steps of:

providing feedback data obtained from said first and second production lines to said production information supervisory computer through said first and second line supervisory computers respectively, to control said first and second line supervisory computers so that said first and second supervisory computers cooperate with each other through said production information supervisory computer; and storing said feedback data in association with said read cartridge ID numbers.

20. A method as claimed in claim 19, wherein said feedback data includes performance data and production history data, said performance data indicating the numbers of products and semi-products produced in the respective production lines, and the number of rejected products or rejected semi-products, said production history data including the types or production lot numbers of materials actually supplied to the respective production lines.

21. A method as claimed in claim 20, wherein there is a third production line for packaging said photo film cartridges, said method further comprising the steps of:

providing package ID numbers on individual packaging materials before having said photo film cartridges packaged therein;

correlating said package ID numbers of said individual packaging materials with cartridge ID numbers of said packaged photo film cartridges respectively by a third line supervisory computer controlling said third production line;

sending said package ID numbers being correlated with said cartridge ID numbers from said third line supervisory computer to said production information supervisory computer; and storing said package ID numbers in said production information supervisory computer along with said feedback data in association said cartridge ID numbers.

22. A method as claimed in claim 21, wherein every predetermined plural number of said packaged photo film cartridges are packed in a box, said method further comprising the steps of:

providing a box ID number on each box;

correlating said box ID number with package ID numbers of those packaged photo film cartridges which are packed in said each box;

storing said correlation between said box ID number and said package ID numbers in said production information supervisory computer.

23. A method of managing information for production of a plurality of different types photo film cartridges, wherein a first production line produces cartridge shells, and a second production line produces and winds filmstrips individually into said cartridge shells to produce said photo film cartridges, and wherein said filmstrips are cut from a continuous strip in said second production line, and a plurality of said continuous strips are formed by slitting a wider web of photo film, said method comprising the steps of:

controlling said first production line by a first line supervisory computer in accordance with production order data from an information supervisory computer;

controlling said second production line by a second line supervisory computer in accordance with production order data from said information supervisory computer;

controlling said slitting process by a fourth supervisory computer;

generating defect data in said fourth supervisory computer when a temporary disorder is detected in said slitting process or a defective portion is detected in one of said continuous strip, said defect data including identification data of a roll of wider web which is subjected to said slitting process at the time of said disorder, or from which said one continuous strip having said defective portion is formed, slit position data representative of an original position of said one continuous strip in a lateral direction of said wider web, and position data of said defective portion in a longitudinal direction of said one continuous strip;

storing said defection data from said fourth supervisory computer in said production information supervisory computer;

monitoring advanced length of said continuous strip in said second production line; and controlling said cutting process of said continuous strip based on said advanced length and said defection data such that said defective portion is cut out to be eliminated from said second line.

\* \* \* \* \*